United States Patent [19]
Suzuki et al.

[11] Patent Number: 5,914,581
[45] Date of Patent: Jun. 22, 1999

[54] INFORMATION RECORDING DEVICE

[75] Inventors: Yuzuru Suzuki; Sakae Fujitani; Masahisa Ezuka, all of Shizuoka, Japan

[73] Assignee: Minebea Co., Ltd., Kitasaku-Gun, Japan

[21] Appl. No.: 08/732,036

[22] Filed: Oct. 16, 1996

[30] Foreign Application Priority Data

Oct. 31, 1995 [JP] Japan .................................. 7-283078

[51] Int. Cl.$^6$ ........................................................ H02P 5/28
[52] U.S. Cl. ........................... 318/798; 318/561; 318/75; 318/78.01; 318/78.06
[58] Field of Search .................................... 318/561, 696, 318/685, 432, 433, 434; 360/75, 78.01, 78.06, 78.13

[56] References Cited

U.S. PATENT DOCUMENTS

| | | | |
|---|---|---|---|
| 5,293,565 | 3/1994 | Jaquette et al. | 369/32 |
| 5,576,909 | 11/1996 | Dierkes et al. | 360/78.09 |
| 5,691,857 | 11/1997 | Fitzpatrick et al. | 360/77.06 |

*Primary Examiner*—William M. Shoop, Jr.
*Assistant Examiner*—Kim Lockett
*Attorney, Agent, or Firm*—Fay, Sharpe, Beall, Fagan, Minnich & McKee

[57] ABSTRACT

In order to raise the drive efficiency of a spindle motor that drives a recording disk for information recording and hence to achieve power saving/lowering of noise level of the information recording device as a whole, in an information recording device wherein a synchronous motor is employed as the spindle motor that drives the recording disk for information recording, and wherein the head is accessed for purposes of reading or writing information at a designated position on the recording disk, with change in mechanical output of this spindle motor, the mechanical output value sought for the spindle motor is found from the head position on the recording disk before and after access, and the thus-found mechanical output value is used to adjust the electrical input to the spindle motor.

19 Claims, 5 Drawing Sheets

FIG. 3

| HEAD TRACK POSITION | DIAMETER ON DISK (mm) | TORQUE COMMAND VALUE |
|---|---|---|
| TRACKS 0 TO 19 | S0  φ79 ~ φ71.875<br>S1  φ76 ~ φ68.875 | A |
| TRACKS 20 TO 39 | S0  φ71.5 ~ φ64.375<br>S1  φ68.5 ~ φ61.375 | B |
| TRACKS 40 TO 59 | S0  φ64 ~ φ56.875<br>S1  φ61 ~ φ53.875 | C |
| TRACKS 60 TO 79 | S0  φ56.5 ~ φ49.375<br>S1  φ53.5 ~ φ46.375 | D |

INFORMATION RECORDING DEVICE

BACKGROUND OF THE INVENTION

1. Field of the Invention

The present invention relates to an information recording device such as for example an FDD, wherein the information is accessed by rotating a disk-shaped recording medium.

2. Description of the Related Art

An FDD (floppy disk drive) is employed for the writing or reading of information to or from disk-shaped information recording media called floppy disk that is used in word processors or personal computers. The spindle motor that is employed to effect rotary drive of the floppy disk in an FDD needs to have a wide torque range and high rotational accuracy is demanded, so, conventionally, a DC brushless motor was usually employed. A DC motor is available at low cost and can provide high torque but requires a brush and so suffers from problems regarding reliability and is therefore not used much. In contrast, a DC brushless motor suffers from no problems at all with respect to reliability, but needs to be provided with a position detector and is therefore unavoidably expensive.

Also, whether a DC motor or DC brushless motor is employed, rotary speed feedback control needs to be provided by adding a speed detector. This means that motor control is by analogue means and the circuit layout becomes large, resulting in a system that cannot meet current demands for the lowering of costs.

On the other hand, with the progress in digital electronics technologies in recent years, in low-cost two-phase claw pole type stepping motors, techniques have become established for achieving rotation with high rotational accuracy as a synchronous motor by a micro step drive system, and a digital control circuit can be constructed without needing to add position detectors or a speed detector in the interior of the motor. This leads to the advantage that the system as a whole can be constructed at low cost. The adoption of such a system is therefore being studied. However, since it is a synchronous motor, it has the drawback that, in the load torque to motor current characteristic, motor current does not increase and decrease in proportion to the load (as it does with a DC motor), so it cannot cover a wide range of torque (0–80 g•cm) such as is required for an FDD. As a measure for this drawback the current is determined so as to match maximum load, resulting in that large current is supplied even at low load. This has the disadvantages of being uneconomic in regard to power-saving of the device and, in addition, of leading to large vibration/noise due to the current being set at high value.

SUMMARY OF THE INVENTION

With the foregoing in view, it is an object of the present invention to provide an information recording device wherein a low-cost synchronous motor (in particular a two-phase stepping motor) is employed for disk drive and, without using position detectors and a speed detector, the motor is driven under open-loop control obtained by low-cost digital processing; whereby the demerit (poor motor drive efficiency) of the characteristic of the synchronous motor described above is overcome and drive efficiency of the drive motor raised by employing in appropriate manner the information possessed by the memory device itself. This in turn makes possible power saving/noise reduction of the device as a whole.

In an FDD, information is accessed whilst the rotational speed of the recording medium is fixed and the head is in frictional contact with this recording medium; thus, assuming that the coefficient of friction is constant over the entire surface of the recording medium in such a mechanism, the amount of load torque originating from the head is a quantity that is proportional to the position of the head on the track (i.e. the radius). Thus, the load torque that is required by the spindle motor for rotation of the recording medium can be uniquely deduced from the position of the head (track) on the recording medium. This deduced information is used, in the form of an electrical input, as a torque command value to match the necessary load torque of the two-phase stepping motor that is used as the spindle motor. More specifically, if the head is seeking an inner circumferential track of the recording medium, the necessary torque is decreased, so the electrical input to the spindle motor is lowered. Conversely, if the head is seeking the outer circumference of the recording medium, the necessary torque is increased, so the electrical input is increased.

In an information recording device according to the present invention wherein a head is accessed in order to read or write information at a designated position on a recording disk, a synchronous motor is used as spindle motor to drive the disk for information recording, the mechanical output value required for the spindle motor is found from the positions of the head on the recording disk before and after access, and electrical input to the spindle motor being adjusted in accordance with the mechanical output value that is thus found.

BRIEF DESCRIPTION OF THE DRAWINGS

FIG. 3 shows the relationship of head track position to diameter on the recording disk to torque command;

DETAILED DESCRIPTION OF THE PREFERRED EMBODIMENTS

The present invention will now be described with reference to the accompanying drawings.

Figure 1A:
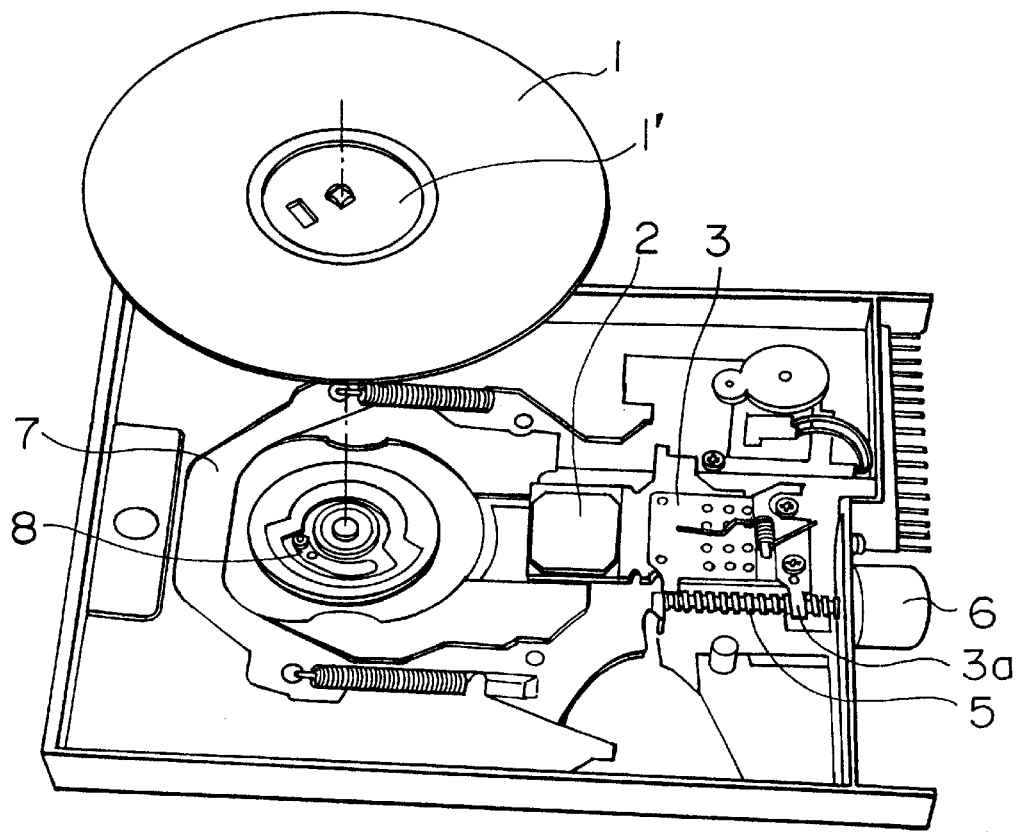
FIG. 1A is a perspective view showing a principle portion of an FDD employing an information recording device according to the present invention.
Figure 1B:
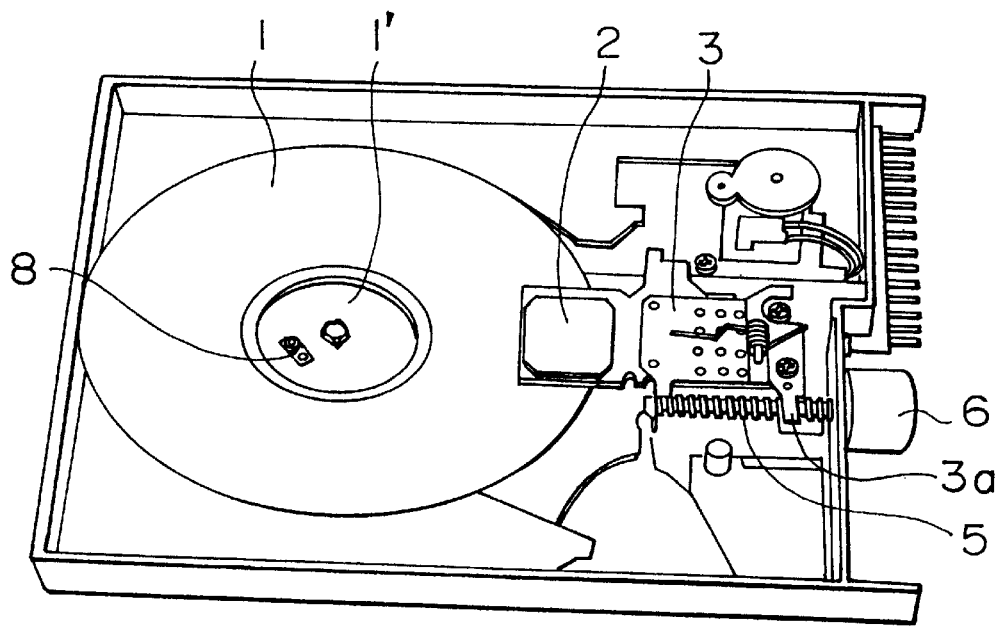
FIG. 1B is a perspective view showing the FDD principle portion with a recording disk in loaded condition.

An FDD (floppy disk drive) is taken by way of example of an information recording device according to the present invention. FIGS. 1A and 1B show diagrammatically an FDD for 3.5 inch disks, with just the portions necessary for explanation of the present invention extracted. FIG. 1A shows the condition with the recording disk removed and FIG. 1B shows the condition with the recording disk mounted.

In the drawings, 1 is a disk-shaped recording medium (hereinbelow referred to as "recording disk"). Fine magnetic particles are coated in the form of concentric circles on both the upper and lower faces of this disk 1. A dish-shaped iron chucking hub 1' having two holes is inserted at the center of this disk 1. Recording disk 1 as a whole is received in a plastic case (not shown) to protect the faces of the recording medium and to facilitate transportation.

2 is a head that is adapted to read information recorded on the disk with a coil inside the head in contact with recording disk 1 in the form of magnetic changes of the magnetic particles. In writing of information, the information is written by applying magnetic changes to the magnetic particles on recording disk 1 by means of the coil in head 2. Thus, head 2 has the functions of both reading information that has been written onto recording disk 1 and of writing such information.

3 is a head carriage that carries head 2. Head 2 is arranged at its tip.

Head carriage 3 is the mechanism whereby head 2 is moved linearly to a suitable position (track) on recording disk 1. It is constituted by a stepping motor 6 and a screw 5 that converts the rotary movement of this into linear movement. The conversion of rotary movement into linear movement is achieved by a part 3a of head carriage 3 engaging the groove of screw 5, so that, when screw 5 is rotated, the entire head carriage 3 is moved linearly. In this way, head 2 can be moved to any desired track position on recording disk 1 by means of a position command (determined by the number of pulses supplied to stepping motor 6) supplied to stepping motor 6.

7 is a spindle motor that effects rotary drive of recording disk 1 and which has at the tip of its rotor a chucking mechanism 8 that imparts rotation to iron chucking hub 1' at the center of recording disk 1 whilst holding it in stable fashion. As a result, recording disk 1 is rotated in stable fashion while being clamped by chucking mechanism 8 of spindle motor 7.

The description will now focus on the main points of the present invention, omitting further details of the construction and operation of the FDD for 3.5 inch disks itself.

As described above, the first important point is that head 2 is in a contact-type arrangement, in which frictional force acts thereon due to contact of head 2 with recording disk 1. If in this case the speed of rotation of disk 1 is assumed to be constant and the coefficient of friction between disk 1 and head 2 is practically uniform over the disk surface, the necessary shaft output torque on spindle motor 7 due to the friction of the head 2 can be uniquely deduced as a quantity proportional to the radius on disk 1 (i.e. the track position). That is, the necessary shaft output torque of spindle motor 7 can be uniquely deduced from the position of head 2.

The second point is that a two-phase claw pole type stepping motor has the characteristic advantages of being of low cost and of enabling constant rotary drive to be produced by an open-loop control based on digital signal processing in a condition where no position detectors and no speed detector is provided. So, if such a motor is employed as a spindle motor, an extremely straightforward and low-cost construction can be achieved. However, a property of a two-phase stepping motor is that the speed of rotation and current are determined with respect to the load torque. So, in order to maintain these values constant irrespective of the amount of load, it is necessary to supply a large current even under low load conditions in order to guarantee stable rotation for a wide range of load torque. This results in a mode of use which is disadvantageous from the point of view of power saving. It is of course also disadvantageous from the point of view of vibration.

From the two points described above, an object of the present invention is to provide an information recording device whereby power saving and noise reduction can be achieved using an inexpensive two-phase stepping motor as a spindle motor. The means for achieving this is to control the electrical input to the spindle motor by deducing the necessary shaft output torque of the spindle motor from the head position (track) information. More specifically, if it is known that the head is moving towards the outside of the recording disk, the input power to the spindle motor is increased, thereby raising the generated shaft torque. If it is known that the head is moving towards the inside of the disk, the input power is decreased, thereby lowering the generated shaft output torque, thus saving power. Thus, by performing power control of the spindle motor in accordance with the position information of the head, an information recording device can be constituted wherein it is possible to employ a low cost motor as spindle motor and wherein power saving can be achieved.

Figure 2:
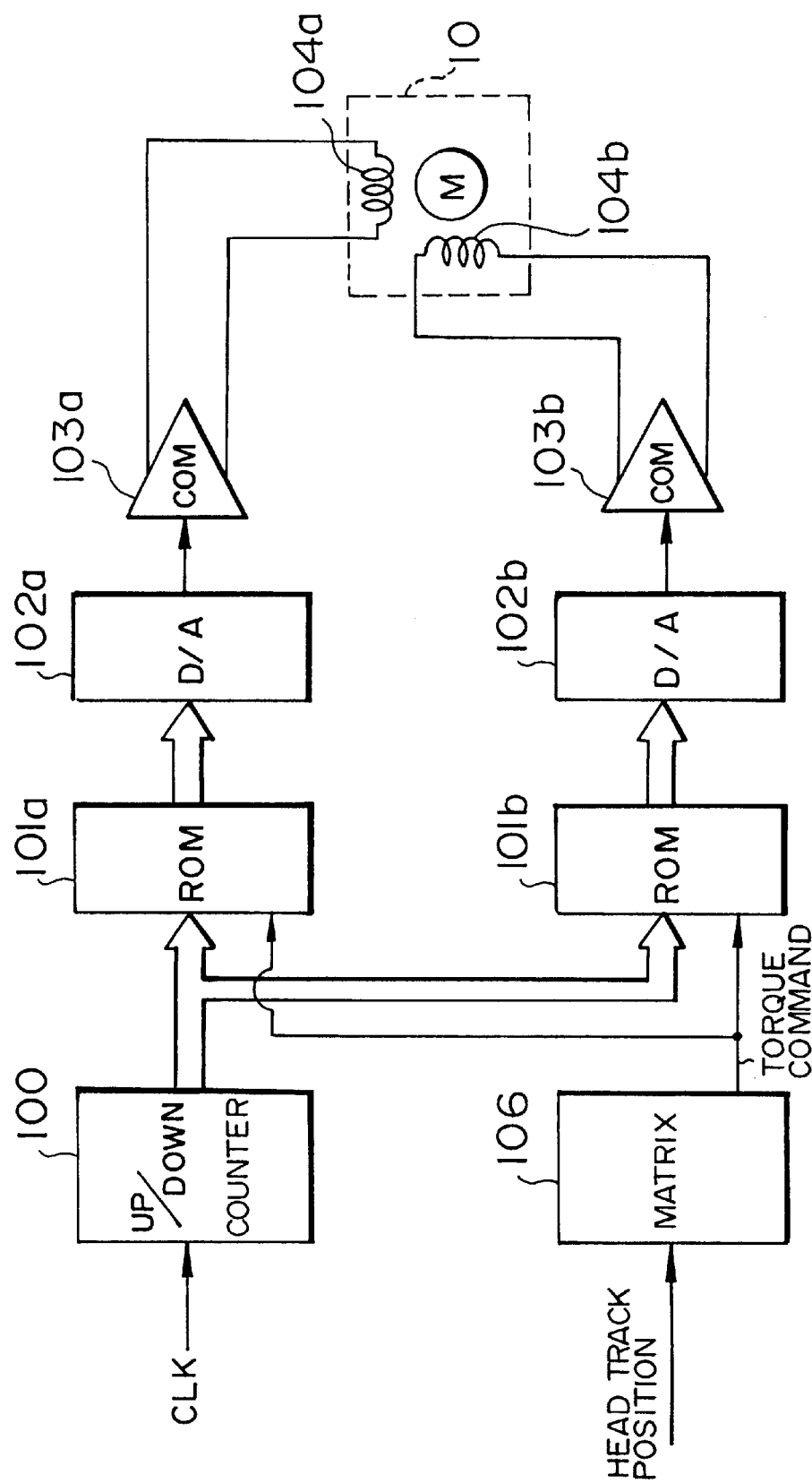
FIG. 2 is a block diagram of an embodiment of a motor control circuit of an information recording device according to the present invention.

FIG. 2 shows an embodiment of a motor control circuit of an information recording device according to the present invention. This embodiment is an example in which a two-phase claw pole type stepping motor is employed as the 3.5 inch FDD spindle motor, and this is rotated at a fixed speed of 300 rpm by a micro step drive. Details are shown below.

In FIG. 2, 100 is an UP/DOWN counter that counts a clock pulse CLK and generates address signals of ROMs 101a and 101b. A plurality of excitation patterns of fixed frequency and different amplitude but of equal form factor are stored in ROM 101a and ROM 101b,; which pattern is selected is uniquely done by means of a torque command.

D/A converters 102a, 102b convert the content of ROM 101a, 101b respectively to analogue voltages (generate excitation patterns). After power amplification by power amplifiers 103a, 103b, these are used to excite coils 104a, 104b of stepping motor 105. The information content recorded in ROMs 101a and 101b is of course such as to produce a so-called two-phase signal output, in which the phase relationship of D/A converters 102a, 102b represents a difference of 90° in terms of electrical angle. In this embodiment, a sine wave is recorded on ROM 101a and a cosine wave is recorded on ROM 101b. However, in order to increase accuracy of rotation, it is preferable to superimpose on this sine wave and cosine wave a correction corresponding to the detent torque that is characteristic of the motor. Furthermore, since the core loss in the drive motor depends on the amplitude of the coil excitation wave form the sine wave and cosine wave can be distorted so as to compensate for the core loss, depending on the amplitude values in ROMs 101a and 101b.

FIG. 3 shows a specific example of the relationship of head track position to diameter on the recording disk to torque command in the motor control circuit of FIG. 2.

Figure 4:
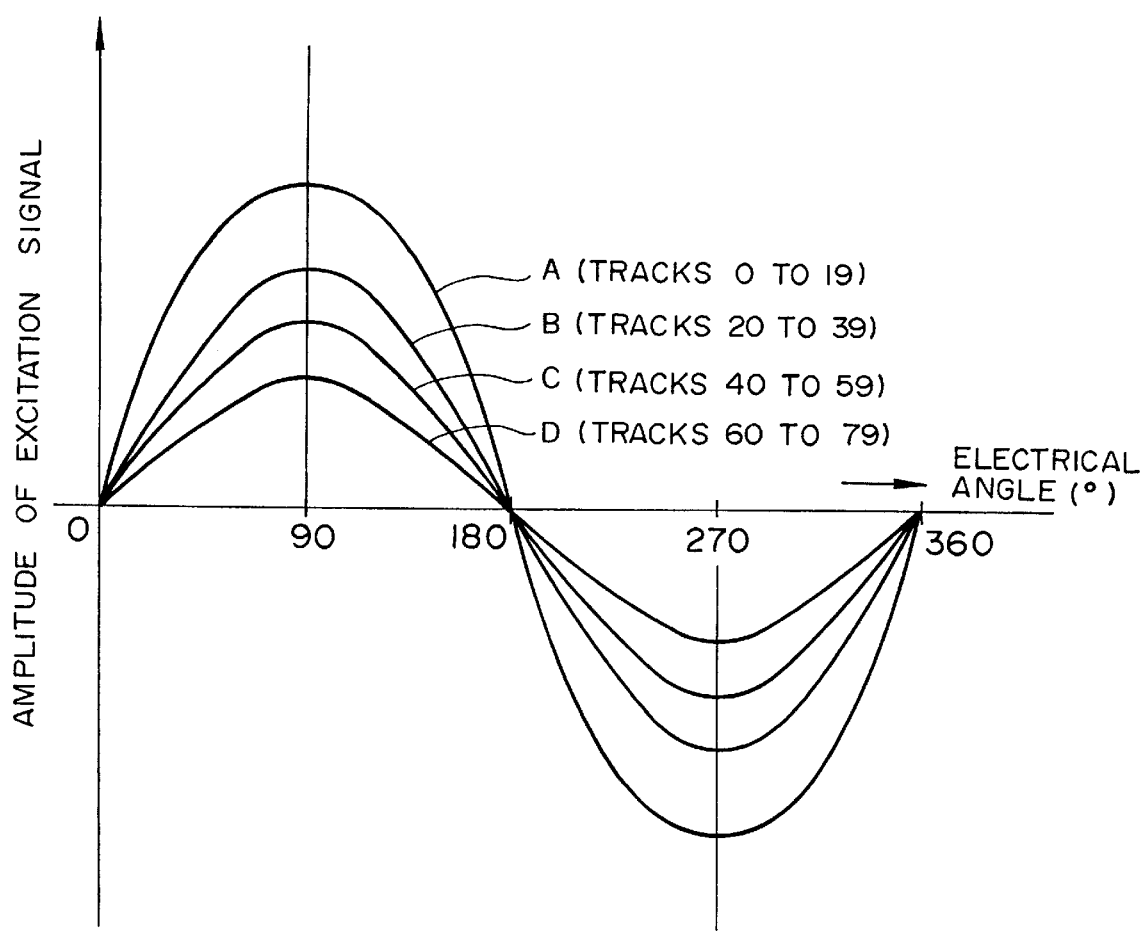
FIG. 4 shows different torque commands with respect to the spindle motor.

In this embodiment, as shown in FIG. 3, the tracks of head track positions 0 to 79 are grouped into four zones consisting of tracks 0 to 19, tracks 20 to 39, tracks 40 to 59 and tracks 60 to 79, different torque commands being associated with these respective zones, as shown in A to D of FIG. 4. FIG. 4 shows the excitation signals (sine waves) recorded in ROM 101a as a specific example of the four different torque command values A to D shown in FIG. 3.

As described above, in ROM 101a of FIG. 2 there are stored four sine waves of different amplitude and one or other of the four torque commands A to D is selected for output depending on the torque command to the spindle motor. It should be noted that, while it is desirable that the timing with which the torque command is altered should be simultaneous with the issuing of the torque command to the head actuator, it is an overriding precondition that the drive motor should not get out of synchronization, so it is necessary to alter this somewhat in the case where the head is going outwards towards the outer periphery or is moving inwards towards the inner perimeter. Essentially this is because, since read/write operation is not performed whilst the head actuator is in motion or during the settling timing, even if there should be some transitional deterioration of accuracy of rotation of the drive motor, this would give no problems at all in regard to timing, and transitional rotational fluctuations produced by the change in the torque command of the spindle motor can be concentrated in this period.

Specifically, let us assume that for example the head is in the track 0 position and drive spindle motor 105 is being driven with amplitude A of ROM 101*a* (and, in the case of ROM 101*b*, by a cosine waveform shifted by an electrical angle of 90°, with amplitude A). In this case, the load torque is the maximum, but (since the head position is at the outermost periphery) the input voltage to coils 104*a*, 104*b* of the motor is the maximum, so spindle motor 105 rotates with the maximum torque being generated. If then an attempt is made to move the head to track 65, in place of the waveform of amplitude A that was hitherto selected, waveform of amplitude D is selected from ROM 101*a* and a voltage of smaller amplitude than hitherto is therefore supplied to spindle motor 105. As a result, the amount of torque generated by spindle motor 105 is decreased by an amount corresponding to that by which the input voltage to coils 104*a*, 104*b* of spindle motor 105 is decreased. However, since the load torque is also decreased by that amount, there is no risk of out of synchronization etc. of spindle motor 105 due to insufficiency of torque. In this way, the input power to spindle motor 105 can be adjusted by uniquely calculating the necessary load torque from the head position; as a result, power-saving drive can be achieved.

Thus, power-saving drive of spindle motor 105 can be achieved by altering the input power to spindle motor 105 in stepwise fashion (in four steps in the case of this embodiment), depending on head position. Although in this embodiment the input power to spindle motor 105 is changed over in four steps, there is of course no restriction to four steps and systems may of course be considered in which these steps are made smaller or, conversely, in which there is a rough changeover of for example two steps.

Although in the embodiment described above a method (PAM) was described in which the amplitude of the voltage supply to the motor was varied in order to adjust the input power to the spindle motor, a method is also possible (PWM) wherein the duty ratio of the voltage supplied to the motor is varied. And it is of course also possible to adjust the motor current.

Figure 5:
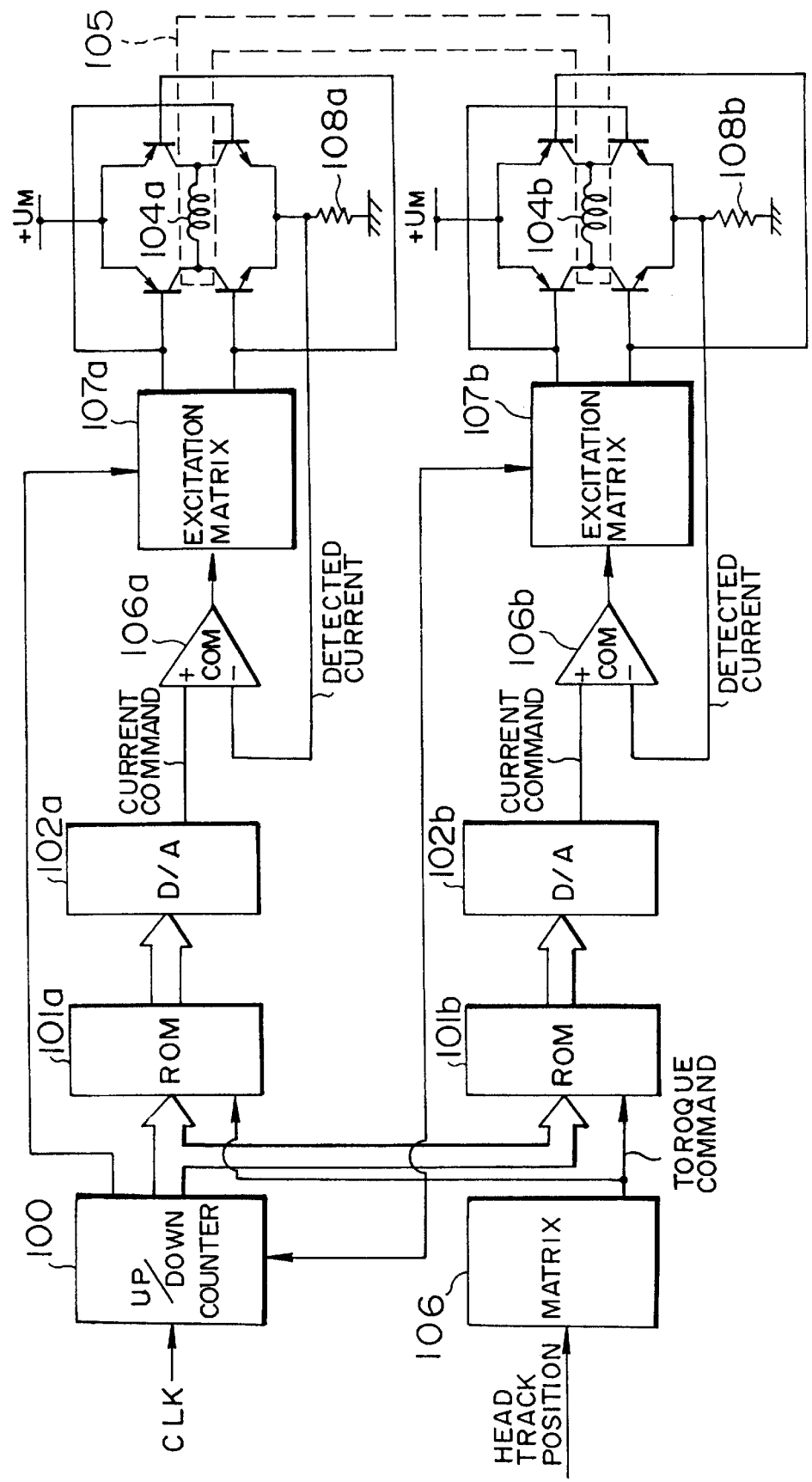
FIG. 5 shows a block diagram of another embodiment of a motor control circuit of an information recording device according to the present invention.

As another embodiment of the present invention, FIG. 5 shows an embodiment in which the spindle motor current is adjusted. In FIG. 5, reference numbers that are the same as in FIG. 2 indicate identical structural elements.

The aspect in which this embodiment differs from the embodiment shown in FIG. 2 in which voltage is adjusted is that the coil currents are detected by detection resistors 108*a*, 108*b* and these detected values of the current and current command values that are output from D/A converters 102*a*, 102*b* are compared by comparators 106*a*, 106*b* and it is arranged for these to be always equal. Excitation matrix 107*a*, 107*b* are logic matrix provided with the object of providing appropriate excitation timing and excitation current values to coils 104*a*, 104*b* of spindle motor 105, in accordance with the output of comparators 106*a*, 106*b* and the signal of UP/DOWN counter 100. The motor currents in coils 104*a*, 104*b* of spindle motor 105 can thus be made equal to the current commands issued by D/A converters 102*a*, 102*b*, and, if the amplitude of the current commands issued by ROMs 101*a*, 101*b* is selected in the same way as in the embodiment of FIG. 2 by having a plurality of excitation patterns of different current amplitudes stored in ROMs 101*a* and 101*b* and selecting the torque command issued to spindle motor 105 in accordance with the track position of the head, the input power can be adjusted by means of the input current to the spindle motor.

The torque range of the spindle motor that is employed in the above embodiments can be chosen as a continuous region (pull-out region) of the stepping motor characteristic. If this is done, it is preferable to combine a frequency-varying circuit (ramp circuit) with the spindle motor drive.

The following benefits are obtained with the present invention.

(1) A large reduction in cost of the memory device can be achieved by using an inexpensive claw-pole type stepping motor as the FDD spindle motor.

(2) A power-saving device can be implemented since the input power to the spindle motor can be adjusted in response to load torque.

(3) Motor vibration/noise can be greatly reduced since only sufficient power is applied to match the load torque.

(4) Since excess power is not used, the self-heating of the motor can be reduced to a low level.

(5) Unevenness of rotation is ameliorated.

What is claimed is:

1. An information recording device, comprising:

a recording disk;

a head carriage;

a head secured in the head carriage and frictionally contacting the recording disk, data being transferred to/from the recording disk during a data access via the head;

a stepping motor for linearly moving the head carriage along the recording disk; and a synchronous motor for rotating the recording disk during the transfer of data to/from the recording disk, wherein, during the data access, the stepping motor moves the head, via the head carriage, in a radial direction to a designated position on said recording disk, an electrical input to the synchronous motor being determined as a function of the designated position of the head on the recording disk, a torque of the synchronous motor being a function of the electrical input.

2. The information recording device according to claim 1, wherein a range of movement of the head in the radial direction on the recording disk is divided into a plurality of zones, the electrical input to the synchronous motor being adjusted as a function of the zone in which the head is positioned.

3. The information recording device according to claim 1, wherein said synchronous motor is a stepping motor.

4. The information recording device according to claim 1, wherein an excitation system of said synchronous motor is a micro step drive.

5. The information recording device according to claim 1, wherein the adjustment of the electrical input to said synchronous motor is effected by a voltage adjustment.

6. The information recording device according to claim 1, wherein the adjustment of the electrical input to said synchronous motor is a current adjustment, a value representing a detected motor current being compared with a reference current value to determine the adjustment.

7. The information recording device according to claim 3, wherein a range of torques employed by said synchronous motor is a continuous region of a characteristic of the stepping motor.

8. The information recording device according to claim 7, wherein a frequency-varying circuit (ramp circuit) is employed to actuate said synchronous motor.

9. An information recording device, comprising:

a recording disk;

a head carriage;

a head, secured in the head carriage, for transferring data to/from the recording disk during a data access;

a first motor for moving the head carriage in a radial direction along the recording disk;

a second motor for rotating the recording disk during the transfer of data to/from the recording disk; and, means for adjusting an output torque produced by the second motor as a function of a radial position of the head along the recording disk.

10. The information recording device according to claim 9, wherein:

the torque produced by the second motor increases as the head moves away from a center of the recording disk; and the torque produced by the second motor decreases as the head moves toward the center of the recording disk.

11. The information recording device according to claim 10, wherein the head frictionally contacts the recording disk.

12. The information recording device according to claim 9, wherein the second motor is a stepping motor.

13. The information recording device according to claim 9, wherein the second motor is a two-phase claw pole type stepping motor.

14. The information recording device according to claim 9, wherein a range of movement of the head in the radial direction on the recording disk is divided into a plurality of zones, the torque produced by the second motor being a function of which one of the zones in which the head is located.

15. A method for performing power control for a synchronous motor in an information recording device, including:

moving a head in a radial direction along a recording disk via a head carriage;

rotating the recording disk using a synchronous motor;

determining a desired torque output from the synchronous motor as a function of a position of the head along the recording disk; and adjusting an electrical input to the synchronous motor in accordance with the desired torque output.

16. The method for performing power control according to claim 15, wherein the determining step is performed both before and after a data access.

17. The method for performing power control according to claim 15, the adjusting step including:

representing a detected motor current as a value; and comparing the value with a reference current value.

18. The method for performing power control according to claim 15, wherein the recording disk is radially divided into a plurality of zones, the determining step including:

determining the mechanical output value for the synchronous motor as a function of the zone in which the head is located.

19. The method for performing power control according to claim 15, the moving step including:

frictionally moving the head along the recording disk.

* * * * *